US007296259B2

(12) United States Patent
Betker et al.

(10) Patent No.: US 7,296,259 B2
(45) Date of Patent: Nov. 13, 2007

(54) PROCESSOR SYSTEM WITH CACHE-BASED SOFTWARE BREAKPOINTS

(75) Inventors: Michael Richard Betker, Allentown, PA (US); Bryan Schlieder, Bethlehem, PA (US); Shaun Patrick Whalen, Wescosville, PA (US); Jay Patrick Wilshire, Pennsburg, PA (US)

(73) Assignee: Agere Systems Inc., Allentown, PA (US)

( * ) Notice: Subject to any disclaimer, the term of this patent is extended or adjusted under 35 U.S.C. 154(b) by 827 days.

(21) Appl. No.: 10/241,400

(22) Filed: Sep. 11, 2002

(65) Prior Publication Data

US 2004/0049712 A1 Mar. 11, 2004

(51) Int. Cl.
G06F 9/44 (2006.01)
G06F 7/38 (2006.01)
(52) U.S. Cl. .................. 717/129; 717/124; 717/130; 712/227
(58) Field of Classification Search ........ 717/100–178; 714/30–54; 712/200–227
See application file for complete search history.

(56) References Cited

U.S. PATENT DOCUMENTS

| | | | | |
|---|---|---|---|---|
| 5,493,664 | A * | 2/1996 | Doi ........................ | 711/100 |
| 5,699,551 | A * | 12/1997 | Taylor et al. ............... | 711/207 |
| 5,724,505 | A * | 3/1998 | Argade et al. ............... | 714/45 |
| 5,889,981 | A * | 3/1999 | Betker et al. ............... | 712/227 |
| 6,052,774 | A * | 4/2000 | Segars et al. ............... | 712/200 |
| 6,092,186 | A * | 7/2000 | Betker et al. ............... | 712/233 |
| 6,223,266 | B1* | 4/2001 | Sartore ..................... | 711/170 |
| 6,256,775 | B1* | 7/2001 | Flynn ...................... | 717/127 |
| 6,505,309 | B1* | 1/2003 | Okabayashi et al. .......... | 714/35 |
| 6,567,839 | B1* | 5/2003 | Borkenhagen et al. ........ | 718/103 |
| 6,681,384 | B1* | 1/2004 | Bates et al. ................ | 717/129 |
| 6,691,308 | B1* | 2/2004 | Kasper ..................... | 717/168 |
| 6,934,937 | B1* | 8/2005 | Johnson et al. ............. | 717/129 |
| 2002/0100020 | A1* | 7/2002 | Hunter et al. ............... | 717/124 |

(Continued)

FOREIGN PATENT DOCUMENTS

EP 470574 A2 * 2/1992

OTHER PUBLICATIONS

Stewart et al., "Non-Stop Monitoring and Debugging on Shared-Memory Multiprocessors," 1997.*

(Continued)

Primary Examiner—Meng-Al T. An
Assistant Examiner—Insun Kang

(57) ABSTRACT

Techniques are disclosed for implementing software breakpoints in a processor system having at least one processor coupled to a main memory and associated with an instruction cache. A breakpoint code is inserted at a particular location in the instruction cache of at least a given one of the processors, and a control indicator associated with the particular location is set to a first state which allows the breakpoint code to be returned to the given processor from the instruction cache in response to a first fetch request directed to a corresponding address. Subsequently, the control indicator associated with the particular location is set to a second state which directs that a second fetch request to the corresponding address be serviced from the main memory. The control indicator state is then changed again after a determination has been made, from the control indicator having been set to the second state, that the second fetch request to the corresponding address will be serviced from the main memory.

16 Claims, 4 Drawing Sheets

U.S. PATENT DOCUMENTS

| | | | |
|---|---|---|---|
| 2002/0100024 A1* | 7/2002 | Hunter et al. | 717/129 |
| 2002/0152330 A1* | 10/2002 | Casper et al. | 709/318 |
| 2002/0174415 A1* | 11/2002 | Hines | 717/127 |
| 2003/0014736 A1* | 1/2003 | Nguyen et al. | 717/129 |
| 2003/0074650 A1* | 4/2003 | Akgul et al. | 717/129 |
| 2004/0111707 A1* | 6/2004 | Bliss et al. | 717/129 |
| 2004/0205747 A1* | 10/2004 | Bernstein et al. | 717/174 |
| 2005/0086650 A1* | 4/2005 | Yates et al. | 717/139 |
| 2005/0188358 A1* | 8/2005 | Johnson et al. | 717/129 |

OTHER PUBLICATIONS

U.S. Appl. No. 10/072,529, filed Feb. 8, 2002, M.R. Betker et al., "Multiprocessor System with Cache-Based Software Breakpoints."

* cited by examiner

```
P0 state: NONDEBUG
P0 cache[index(swbpt)]  V state: 1
P0 cache[index(swbpt)]  D state: debug lock
P0 cache[index(swbpt)]  Tag state: tag(swbpt)
P0 cache[index(swbpt)]  Data state: DEBUG
P1 state: NONDEBUG
P1 cache[index(swbpt)]  V state: 0
P1 cache[index(swbpt)]  D state: nondbg
P1 cache[index(swbpt)]  Tag state: x
P1 cache[index(swbpt)]  Data state: x
P2 state: NONDEBUG
P2 cache[index(swbpt)]  V state: 0
P2 cache[index(swbpt)]  D state: nondbg
P2 cache[index(swbpt)]  Tag state: x
P2 cache[index(swbpt)]  Data state: x
```

(b)

```
P0 state: DEBUG
P0 cache[index(swbpt)]  V state: 1
P0 cache[index(swbpt)]  D state: debug lock
P0 cache[index(swbpt)]  Tag state: tag(swbpt)
P0 cache[index(swbpt)]  Data state: DEBUG
P1 state: NONDEBUG
P1 cache[index(swbpt)]  V state: 1
P1 cache[index(swbpt)]  D state: nondbg
P1 cache[index(swbpt)]  Tag state: tag(swbpt)
P1 cache[index(swbpt)]  Data state: bpopcode
P2 state: NONDEBUG
P2 cache[index(swbpt)]  V state: 0
P2 cache[index(swbpt)]  D state: nondbg
P2 cache[index(swbpt)]  Tag state: x
P2 cache[index(swbpt)]  Data state: x
```

(c)

```
P0 state: DEBUG
P0 cache[index(swbpt)]  V state: 1
P0 cache[index(swbpt)]  D state: don't use once
P0 cache[index(swbpt)]  Tag state: tag(swbpt)
P0 cache[index(swbpt)]  Data state: DEBUG
P1 state: NONDEBUG
P1 cache[index(swbpt)]  V state: 1
P1 cache[index(swbpt)]  D state: nondbg
P1 cache[index(swbpt)]  Tag state: tag(swbpt)
P1 cache[index(swbpt)]  Data state: bpopcode
P2 state: NONDEBUG
P2 cache[index(swbpt)]  V state: 0
P2 cache[index(swbpt)]  D state: nondbg
P2 cache[index(swbpt)]  Tag state: x
P2 cache[index(swbpt)]  Data state: x
```

(d)

```
P0 state: NONDEBUG
P0 cache[index(swbpt)]  V state: 1
P0 cache[index(swbpt)]  D state: debug lock
P0 cache[index(swbpt)]  Tag state: tag(swbpt)
P0 cache[index(swbpt)]  Data state: DEBUG
P1 state: NONDEBUG
P1 cache[index(swbpt)]  V state: 0
P1 cache[index(swbpt)]  D state: nondbg
P1 cache[index(swbpt)]  Tag state: x
P1 cache[index(swbpt)]  Data state: x
P2 state: NONDEBUG
P2 cache[index(swbpt)]  V state: 1
P2 cache[index(swbpt)]  D state: nondbg
P2 cache[index(swbpt)]  Tag state: tag(swbpt)
P2 cache[index(swbpt)]  Data state: bpopcode
```

PROCESSOR SYSTEM WITH CACHE-BASED SOFTWARE BREAKPOINTS

RELATED APPLICATION(S)

The present invention is related to the invention described in U.S. patent application Ser. No. 10/072,529, filed Feb. 8, 2002 in the name of inventors M. R. Betker et al. and entitled "Multiprocessor System with Cache-Based Software Breakpoints," which is hereby incorporated by reference herein.

FIELD OF THE INVENTION

The present invention relates generally to processor integrated circuits and other types of systems which include one or more processors, and more particularly to techniques for implementing software breakpoints in such systems.

BACKGROUND OF THE INVENTION

Software breakpoints are typically implemented as assembly instructions embedded in a program. A given one of these assembly instructions when encountered in the program causes execution of the program to transfer to a debugger. As is well known, the use of designated breakpoints in conjunction with the debugger allows a programmer to inspect the state of the program in order to fix a problem or better understand program behavior.

In the case of a single conventional processor, a software breakpoint may be embedded in a program by overwriting an existing instruction at the desired breakpoint location with an assembly instruction in the form of a specified debug operation code, also referred to as an opcode. The overwritten instruction is stored by the debugger so that it may subsequently replace the inserted opcode upon resumption of normal operation, as will be described below. Examples of conventional debug opcodes include opcodes referred to as DEBUG, TRAP, etc. These debug opcodes generally vary depending on the processor.

After a given breakpoint is taken and the programmer is ready to continue with normal execution of the program, a two step process typically takes place. First, the debugger replaces the debug opcode with the previously-overwritten existing instruction, so that this instruction alone may be executed (or "stepped"). Then the debug opcode is restored at the desired breakpoint location so that the next time program execution reaches this point, another breakpoint will occur.

Many high performance processors include an instruction cache. An instruction cache enables the processor to store frequently accessed instructions in a fast local memory that adapts its contents to the executing program.

A multiprocessor system generally includes multiple processors each connected to a common bus. Also connected to the common bus is a shared main memory that stores instructions and data for use by the processors. In such a system, each of the processors will typically have its own instruction cache. These instruction caches are particularly important in multiprocessor systems in that the caches serve to significantly reduce the bus traffic associated with the instruction and data fetches of the multiple processors.

The conventional single-processor software breakpoints described above generally do not work in a multiprocessor system. More particularly, in a multiprocessor system, once a particular one of the processors has taken a software breakpoint, the corresponding actual instruction must be written to the shared memory so the stopped processor can subsequently fetch and execute it. However, while the actual instruction is in shared memory, the other processors may fetch and execute it, thus missing the breakpoint. Thus, in a shared-memory multiprocessor system, the programmer utilizing conventional single-processor software breakpoint techniques would be likely to observe erratic behavior, e.g., sometimes a given processor would stop at a software breakpoint and other times it would not.

Examples of known multiprocessor systems include the DSP 16410 and DSP 16270 shared-memory multiprocessor digital signal processors (DSPs) available from Agere Systems Inc. of Allentown, Pa., USA. Each of these systems includes two processors, denoted DSP0 and DSP1. These processors do not have instruction caches, but can execute from a common shared memory. Consider a case where a software breakpoint has been set in the shared memory and executed by DSP0. In order to resume normal execution after the breakpoint is taken, the actual instruction code at the breakpoint location should be placed in local memory that is private to DSP0. This enables DSP0 to execute the actual instruction without preventing DSP1 from hitting the desired breakpoint. Implementing multiprocessor software breakpoints on the DSP16410 or the DSP16270 therefore may require local instruction memory, which adds to the cost of the device. In addition, rebuilding the executable code so that the breakpoint debug opcode is moved to the address space corresponding to the local memory can be inconvenient and time consuming for the programmer. These and other similar problems arise in a wide variety of other conventional multiprocessor systems.

The above-cited U.S. patent application Ser. No. 10/072,529 provides improved techniques for implementing software breakpoints in shared-memory multiprocessor systems, so as to avoid one or more of the above-described problems. An illustrative arrangement described therein is more specifically directed to resuming from a common software breakpoint, that is, a software breakpoint for which all of the processors in the multiprocessor system stop. The software breakpoint is configured to ensure that a specified debug opcode or other breakpoint code can remain present in the main memory of the multiprocessor system at all times, such that all of the processors of the system will reliably fetch and execute that breakpoint code even if one or more of these processors are resuming execution from the breakpoint.

In certain multiprocessor systems, however, it may be desirable to stop one or more, but less than all, of the processors. This may occur, by way of example, in debugging an application which is configured to run continuously or has real-time processing constraints. In a typical multiprocessor system, software breakpoints may be intrusive to such non-stop or real-time applications. More particularly, if a software breakpoint is set in main memory, all of the processors may fetch and execute it, even though the breakpoint may not be intended for all of the processors. Each processor upon stopping at the breakpoint determines if it is an intended target of the breakpoint. If a given processor is a target of the breakpoint, it transfers control to the debugger, and if it is not a target of the breakpoint, it resumes execution. In either case, while the given processor was stopped it may have violated real-time processing constraints or other application requirements, thereby leading to a system failure. Even for a processor that is an intended target of the breakpoint, it may be preferable to minimize the amount of time that the processor is stopped. For example, the action on stopping may be to execute a debug script and then automatically resume execution.

This intrusiveness issue is in large part due to the fact that all of the processors are sharing the same main memory, and unfortunately is not adequately addressed by conventional usage of the above-noted instruction caches.

It is therefore apparent that, despite the considerable advances provided by the techniques described in the above-cited U.S. patent application Ser. No. 10/072,529, a need exists for further improvements in implementing cache-based software breakpoints for single-processor and multi-processor systems, particularly for software breakpoints used in the above-noted non-stop or real-time processing applications.

SUMMARY OF THE INVENTION

The invention provides improved techniques for implementing software breakpoints in a single-processor system or a shared-memory multiprocessor system.

In accordance with one aspect of the invention, techniques are provided for implementing exclusive software breakpoints in a shared-memory multiprocessor system. An exclusive software breakpoint, as the term is used herein, refers generally to a software breakpoint for which one or more, but less than all, of the processors of the multiprocessor system stop.

In an illustrative embodiment of the invention, an exclusive software breakpoint is implemented in a multiprocessor system having a number of processors each coupled to a main memory and each having an instruction cache associated therewith. A breakpoint code is inserted at a particular location in the instruction cache of at least a given one of the processors, and a control indicator associated with the particular location is set to a first state which allows the breakpoint code to be returned to the given processor from the instruction cache in response to a first fetch request directed to a corresponding address. After a determination has been made, from the control indicator having been set to the first state, that the breakpoint code will be returned to the given processor from the instruction cache in response to the first fetch request, the control indicator associated with the particular location is set to a second state which directs that a second fetch request to the corresponding address will be serviced from the main memory. The control indicator state is then changed again, e.g., reset back to the first state, after a determination has been made, from the control indicator having been set to the second state, that the second fetch request to the corresponding address will be serviced from the main memory. While the control indicator is set to the first state, a miss event in the instruction cache does not lead to replacement of the breakpoint code in the particular location in the instruction cache.

The control indicator may be in the form of a single-bit or multi-bit indicator associated with a given set of the instruction cache. For example, a single-bit indicator may be utilized in which the first state comprises a debug lock state and the second state comprises a don't use once state. A two-bit indicator may specify at least one additional state, comprising a normal mode of operation state specifying operation without utilization of the software breakpoint. Other control indicator formats can also be used.

Advantageously, the invention ensures that the processor(s) not targeted by the exclusive breakpoint can continue normal operation, while also allowing the targeted processor(s) to resume from the breakpoint in an efficient manner.

As indicated above, the techniques of the invention can also be applied to single-processor systems.

BRIEF DESCRIPTION OF THE DRAWINGS

FIG. 5 is an example illustrating the operation of a three-processor implementation of a multiprocessor system in accordance with the invention.

DETAILED DESCRIPTION OF THE INVENTION

The invention will be illustrated herein in conjunction with an exemplary shared-memory multiprocessor system. It should be understood, however, that the invention is more generally applicable to any processor system in which it is desirable to provide improved performance through the use of software breakpoints, including a single-processor system, e.g., a system comprising a processor, an instruction cache and a main memory. The term "processor system" as used herein is intended to include any device in which retrieved instructions are executed using one or more processors. The term "processor" is intended to include, by way of example and without limitation, microprocessors, central processing units (CPUs), very long instruction word (VLIW) processors, single-issue processors, multi-issue processors, digital signal processors (DSPs), application-specific integrated circuits (ASICs), and other types of data processing devices, as well as portions and combinations of these and other devices.

Figure 1:
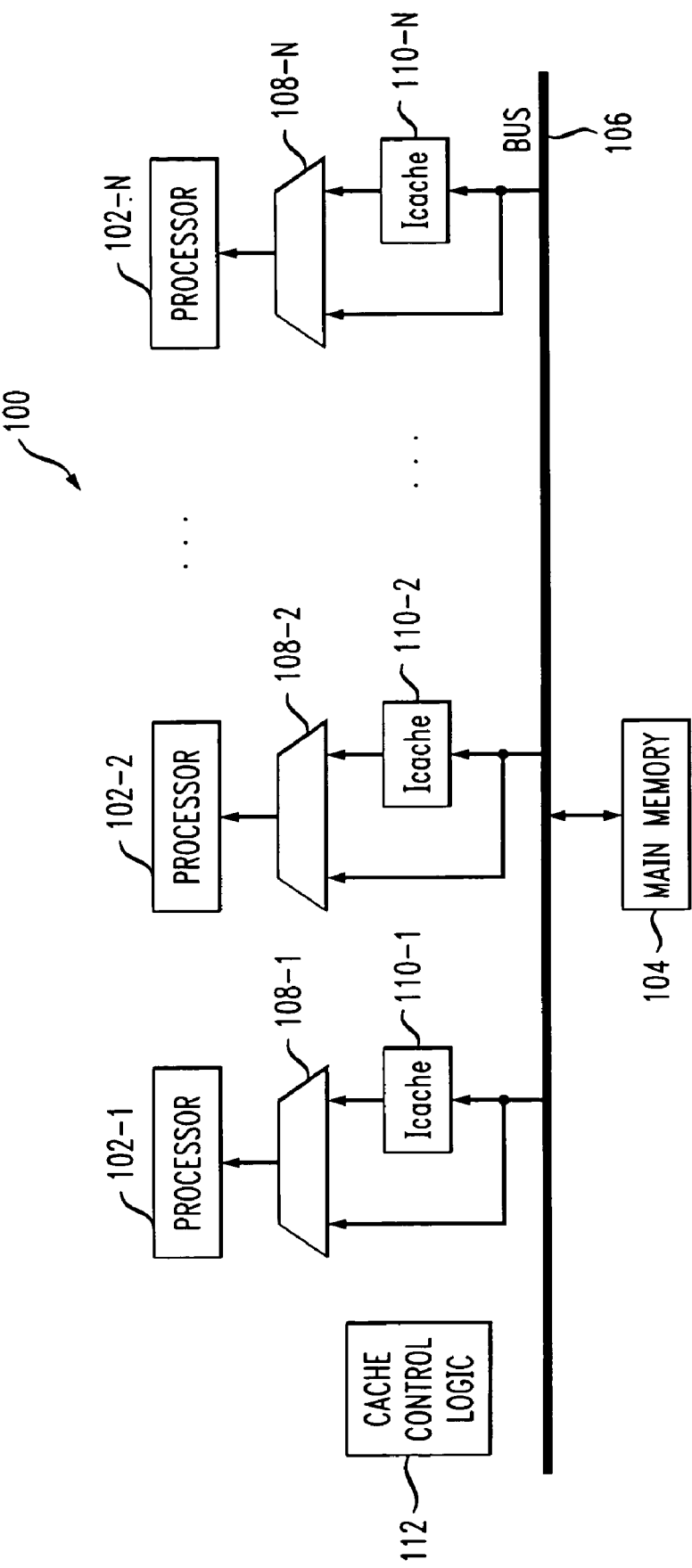
FIG. 1 is a block diagram of an example multiprocessor system in which the present invention is implemented.

FIG. 1 shows a shared-memory multiprocessor system 100 in which the present invention is implemented. The system 100 includes a number of processors 102-1, 102-2, . . . 102-N, each coupled to a main memory 104 via a common bus 106. Also associated with each of the processors 102-$i$, i=1, 2, . . . N, is a corresponding multiplexer 108-$i$ and instruction cache (Icache) 110-$i$. In operation, the processors 102 each retrieve instructions for execution, as well as associated data, from the main memory 104. The instructions may be retrieved directly from the main memory 104 via a first path through the multiplexer 108, or from the instruction cache 110 via a second path through the multiplexer 108. The processors 102 also return instruction execution results to the main memory 104 via bus 106, although separate return paths from the processors to the bus 106 are not explicitly shown in the figure. These return paths may be combined in whole or in part with the illustrative signal lines used to retrieve the instructions and data, i.e., bidirectional signal lines may be used.

Also included in the multiprocessor system 100 is a set of cache control logic 112. Although not explicitly shown as such in the figure, the cache control logic 112 may be coupled to each of the instruction caches 110. Alternatively, the cache control logic 112 may be distributed across the instruction caches 110 such that a portion of the cache control logic 112 forms an internal portion of each of the instruction caches 110. Other arrangements may also be used, e.g., various combinations of centralized and distributed logic. For example, portions of the cache control logic may be distributed across the processors 102.

The operation of the cache control logic 112 will be described in greater detail below in conjunction with the description of FIGS. 2 through 5. Suitable hardware or software elements, or various combinations thereof, may be configured in a straightforward manner to provide the cache control logic functionality described herein, as will be appreciated by those skilled in the art. The cache control logic 112 may therefore be implemented in hardware, in software, or as a combination of hardware and software.

It should be noted that it is common in a shared-memory multiprocessor system such as system 100 to associate attributes with instruction addresses to control the handling of an instruction fetch. For example, one known attribute is the so-called "noncacheable" attribute. This attribute indicates whether a particular instruction address is allowed to be stored in the instruction cache. Each of the processors 102 typically includes hardware for interpreting such attributes. For an instruction address with the noncacheable attribute, the cache control logic typically always treats a fetch to this address as a miss.

As noted above, an exclusive software breakpoint refers generally to a software breakpoint for which one or more, but less than all, of the processors of the system stop.

In accordance with the present invention, the instruction caches 110 of the FIG. 1 system are configured so as to permit a debugger to place and mark an existing instruction, for which an exclusive breakpoint is to be established, in a given one of the instruction caches of a particular processor. Advantageously, the placing and marking of the instruction may be configured so as to ensure that other processors of the system for which the exclusive breakpoint is not intended will not stop at the breakpoint, while also allowing any stopped processor(s) to more efficiently resume from the breakpoint. The illustrative embodiment of the invention implements this capability in part through the addition of one or more control bits, more specifically referred to herein as debug control (D) bits, to instruction information stored in the instruction cache, and by permitting the debugger to write this information directly to the instruction cache.

Figure 2:
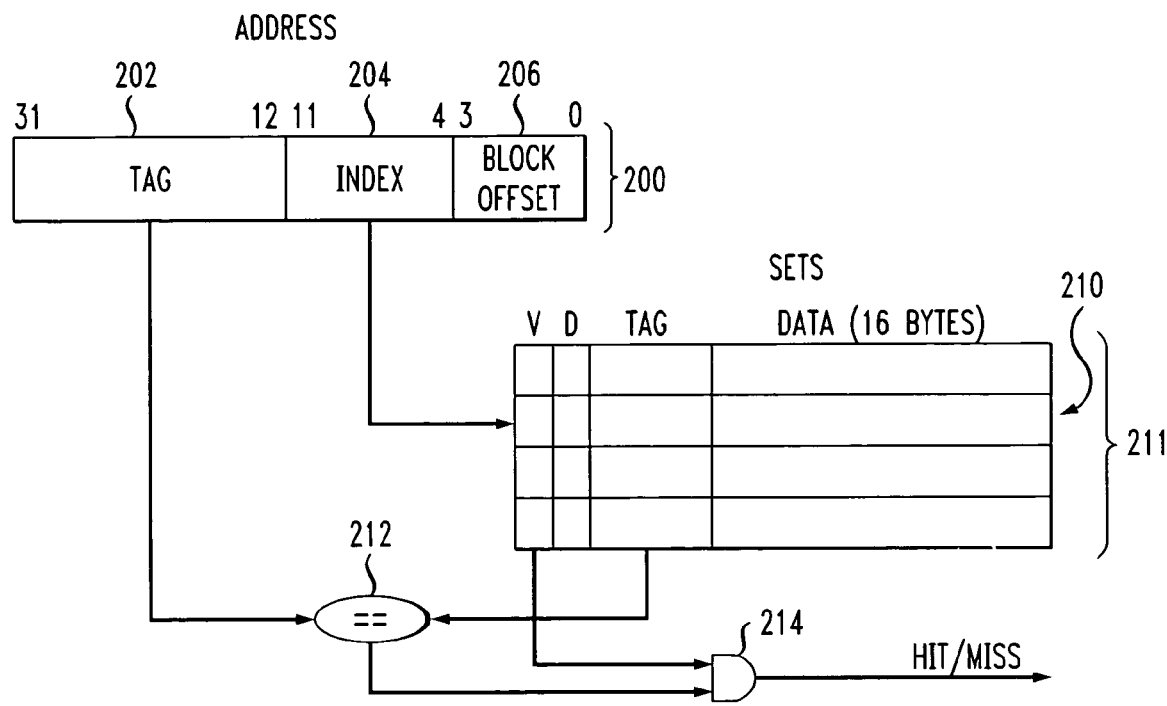
FIG. 2 illustrates the operation of an instruction cache of the FIG. 1 multiprocessor system in accordance with the invention.
Figure 3:
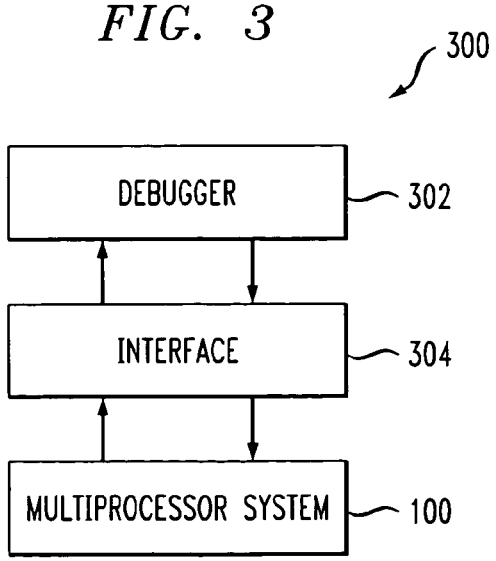
FIG. 3 illustrates the interaction of the FIG. 1 multiprocessor system with a debugger.

FIG. 2 illustrates the instruction processing in a given one of the instruction caches 110 of the FIG. 1 system, i.e., a particular instruction cache 110-$i$, although it should be understood that substantially the same instruction processing is utilized in each of the instruction caches 110. In the illustrative embodiment, when the corresponding processor 102-$i$ fetches an instruction from the instruction cache 110-$i$, it presents an address 200 to the cache. The address 200 as shown in FIG. 2 includes a tag field 202, an index field 204, and a block offset field 206. The address 200 in this example is a 32-bit address, with bits 0-3 corresponding to the block offset, bits 4-11 corresponding to the index, and bits 12-31 corresponding to the tag.

It should be emphasized that this particular address arrangement is by way of example only, and other address lengths and field configurations may be used. In other words, the invention does not require that the presented address have a particular format.

The index field 204 of the address 200 is used to select one of several sets in the instruction cache 110-$i$. More specifically, the particular value of the index field 204 specifies a particular set 210 within a group 211 of such sets, where each of the sets in the group 211 corresponds generally to a set of one or more instructions stored in the cache. Each set in the group 211 has associated therewith a valid (V) bit, the above-mentioned debug control (D) bits, a tag field, and instruction data, e.g., 16 bytes of instruction data in this illustrative example.

The instruction cache 110-$i$ in accordance with the invention includes logic elements 212 and 214, which may be implemented in a straightforward manner well-known to those skilled in the art. As shown in the figure, logic element 212 compares the tag field 202 of the presented address 200 to the tag field of the set 210 as selected using the index field 204, and logic element 214 performs an AND operation on the output of the logic element 212 and the valid bit. The output of logic element 214 is at a logic high level if for a given set 210 the tag field 202 matches its tag field and its valid bit is set, i.e., at a logic high level. In this situation, the cache is said to "hit" at the instruction address 200, and otherwise to "miss" at the instruction address 200.

In normal operation absent any inserted software breakpoints, if there is a match between the tag field 202 of the address and the tag field of a given set, and the valid bit is set for the given set, then the desired instruction data is in the cache 110-$i$ and is returned to the corresponding processor 102-$i$. If there is no match or the valid bit is clear, the desired instruction data is not in the cache 110-$i$, and therefore must be fetched from the main memory 104.

As indicated above, the debug control bits are utilized to implement exclusive software breakpoints in an advantageous manner in accordance with the techniques of the invention. Such exclusive breakpoints may be inserted using an arrangement such as that shown in FIG. 3. In this particular software breakpoint processing configuration 300, a debugger 302 interacts via an interface 304 with the multiprocessor system 100 of FIG. 1. The debugger 302, which may also be referred to as a debugger tool, may be implemented using appropriately-configured hardware and software elements, as is well known. The interface 304 may also be implemented in manner well understood by those skilled in the art, and is therefore not described in detail herein. It is to be appreciated that the invention does not require the use of any particular type of debugger or multiprocessor system interface. The debugger 302 will typically run on a processor that is not an element of the system 100, but this is by way of example and not limitation. The debugger 302 of FIG. 3 may be utilized to program an exclusive software breakpoint for a given processor of the multiprocessor system 100, as will be described in greater detail below.

The debug control bits referred to above may be implemented in the illustrative embodiment, by way of example and without limitation, as a pair of bits collectively specifying one of three particular debug control states, namely, a "debug lock" state, a "don't use once" state, and a "nondbg" state. The latter state denotes normal operation without any exclusive software breakpoints. The operation of the system 100 using this debug control bit configuration will be described in greater detail below in conjunction with FIGS. 4 and 5.

The debug control bits are more generally referred to herein as a debug control indicator. In the foregoing example, the debug control indicator can take on one of the three states noted above, that is, debug lock, don't use once or nondbg. The invention, however, does not require the use of this particular debug control bit configuration, and numerous other formats may be used in implementing the techniques described herein. For example, a single-bit D indicator may be used, specifying only the debug lock and don't use once states.

It should also be noted that the association of a single debug indicator with each of the cache sets as shown in FIG.

2 is exemplary only. In other embodiments, it may be possible to associate a debug indicator with each instruction in a given cache set.

A given instruction cache 110-$i$ utilizes its corresponding debug control bits in the following manner. In order to set an exclusive software breakpoint for the system 100, a programmer may write a debug opcode into the cache location that normally would hold the corresponding bytes from main memory. The debug control indicator for that cache location is then set to the debug lock state, e.g., from a default state such as the nondbg state. When the processor 102-$i$ fetches from the breakpoint address, there will be a hit in the cache and the debug opcode will be returned to the processor, even if the above-described noncacheable attribute has been set for that address. The processor then executes the debug opcode and enters the debug mode.

If the processor fetches from an address whose index matches the cache set containing the debug opcode, but whose tag does not, the cache control logic does not permit this set to be replaced with new data. Instead, the set containing the debug opcode is preserved so that the breakpoint will be taken when the processor fetches from the breakpoint address with the debug control indicator in the debug lock state.

Once the debugger has handled the breakpoint, it needs to resume the application by fetching and executing the actual instruction on which the breakpoint was placed. To do this, the debugger changes the debug control indicator for the cache location to the don't use once state and resumes the processor. The resumption begins with the processor fetching from the address of the actual instruction. The don't use once state of the debug control indicator directs the cache control logic to service the fetch request from main memory instead of using any matching data from the cache. Thus, the fetch request is forwarded to main memory and the actual instruction is returned from there to the processor. However, after completing the fetch from main memory, the debug control indicator is automatically set back to the debug lock state. Thus, the next time the processor fetches this instruction address, the contents of the cache location with the debug opcode will be returned.

Through this mechanism, only the processor(s) for which the breakpoint is intended execute(s) the debug opcode. Other processors fetch from main memory and execute the actual instruction rather than the debug opcode. Furthermore, a processor that does stop is able to resume more efficiently by eliminating the step of placing the actual instruction in the cache, stepping and then restoring the debug opcode.

Although the exclusive breakpoint process is described above and elsewhere herein for a single processor 102-$i$, it can be extended in a straightforward manner to any subset of the processors of the system 100. More particularly, the process as described for a single processor can simply be repeated for each of the processors for which the breakpoint is intended.

In addition, as was mentioned previously, the invention can be used in a single-processor system, such as a system including a single processor and associated instruction cache and main memory elements. In a single-processor system, the invention provides the advantage of efficiently resuming the processor after a breakpoint is taken.

As indicated above, the debug control state changes the handling of the noncacheable attribute so that an exclusive software breakpoint can be set on a noncacheable instruction. For an exclusive software breakpoint on a noncacheable instruction, the processor fetch is serviced by the cache even though the attribute would otherwise prevent it from being serviced by the cache. Thus, the debug control bits allow exclusive software breakpoints to be set on both cacheable and noncacheable instructions without impacting the other processors in a multiprocessor system such as system 100.

Figure 4:
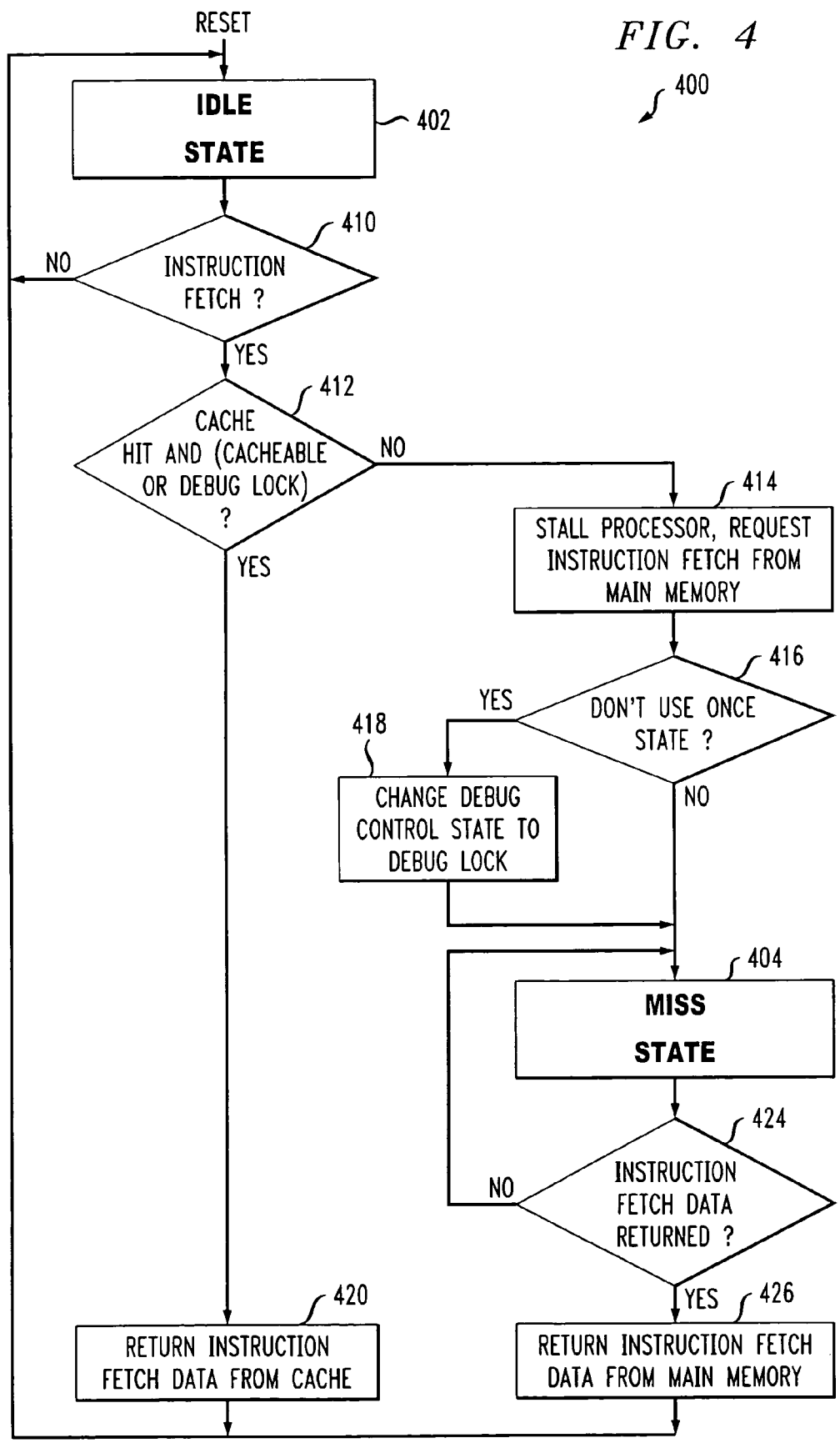
FIG. 4 shows a state and flow diagram illustrating the operation of a multiprocessor system in accordance with the invention.

FIG. 4 shows a state and flow diagram 400 which illustrates in greater detail the above-described cache-based software breakpoint process as implemented in multiprocessor system 100. The diagram 400 includes an IDLE state 402 and a MISS state 404.

The process is initially in the IDLE state, e.g., upon execution of a reset command as shown. From the IDLE state, a determination is made in step 410 as to whether an instruction fetch has been requested by a given processor 102-$i$ of the system. If not, the process remains in the IDLE state. Otherwise, step 412 determines (i) if there has been an instruction cache hit for the given processor, and (ii) if the cacheable attribute is present or the debug control indicator is set to debug lock. If either of conditions (i) and (ii) is not satisfied in step 412, the given processor is stalled and the instruction request is directed to the main memory 104 of the system, as indicated in step 414. Step 416 then determines if the debug control indicator is in the don't use once state. If it is, the debug control indicator state is changed to debug lock in step 418, and the process enters the MISS state 404. Otherwise, the process enters the MISS state 404 without changing the debug control indicator state.

If both conditions (i) and (ii) are satisfied in step 412, the instruction fetch data is returned from the instruction cache as indicated in step 420, and the process returns to the IDLE state 402 as indicated.

From the MISS state 404, the process in step 424 determines if the instruction fetch data has been returned from the main memory. If it has, the process returns the instruction fetch data to the requesting processor as indicated in step 426, and returns to the IDLE state 402 as indicated. Otherwise, the process returns to the MISS state 404.

At least a portion of the operations described in conjunction with FIG. 4 can be implemented using the cache control logic 112 of FIG. 1. For example, the cache control logic may be configured to control the state of the debug control indicator, and to perform other functions associated with the FIG. 4 process. As indicated previously, suitable arrangements of hardware, software or both for accomplishing these and other operations in the cache control logic will be readily apparent to those skilled in the art.

It is also to be appreciated that the particular processing operations shown in FIG. 4 are by way of example only, and should not be construed as limitations of the invention. Those skilled in the art will recognize that the techniques of the invention can be implemented using other arrangements of processing operations.

FIG. 5 is a more particular example illustrating the operation of a three-processor implementation of the multiprocessor system 100 in accordance with the invention. The three processors are denoted P0, P1 and P2 for purposes of this example. The figure includes portions (a) through (d) which represent the changes in the state of the three-processor system 100 as software breakpoints are taken with the debug control mechanism described above. For each of the portions (a) through (d), the states of the three processors are shown. Each line indicates a different aspect of the state of the corresponding processor. The Pi state indicates whether the corresponding processor is in a debug state or a nondebug state. These states are also referred to as modes. The other states utilized in the figure are as follows:

Pi cache[ ... ] V state indicates the state of the valid bit for a specific set in the cache for Pi.

Pi cache[ ... ] D state indicates the state of the debug control bit for a specific set in the cache for Pi.

Pi cache[ ... ] Tag state indicates the state of the tag part for a specific set in the cache for Pi.

Pi cache[ ... ] Data state indicates the state of the data part for a specific set in the cache for Pi.

The expression index(x) denotes the index field 204 of the address of x. The expression cache[y] denotes the set of cache 210 addressed by y. The expression tag(z) indicates the tag field 202 of the address of z.

In (a) all three of the processors are executing operational code and are in the NONDEBUG state. It is assumed that processor P0 has an exclusive software breakpoint set on an instruction at the address swbpt in accordance with the techniques of the invention. The actual instruction at this address is denoted as bpopcode. The debug control indicator for the P0 cache set at the index given by index(swbpt) is set to debug lock, and the actual instruction bpopcode is replaced by the debug opcode. Neither P1 nor P2 have fetched from the swbpt address in main memory into their respective caches at this point, and thus the V states for the P1 and P2 cache sets at the index given by index(swbpt) are set to zero.

In (b), P0 is in the DEBUG state and P1 and P2 remain in the NONDEBUG state. As noted above, the P0 cache has a debug opcode stored in the set identified by index (swbpt). P0 enters the DEBUG state upon fetching and executing this debug opcode. P1 has made a fetch request to this same address (swbpt). Since the debug control indicator of the corresponding cache set is set to nondbg (normal operation), the actual instruction (bpopcode) is fetched from main memory. This illustrates how P0 can take an exclusive software breakpoint on the swbpt address without interfering with execution by P1 of the actual instruction at this address.

In (c), P0 has completed handling of its debug event. In order to resume the application, the debug control indicator of the cache set holding the debug opcode is changed to don't use once. As a result, the next fetch to the swbpt address by P0 will be serviced from main memory. More particularly, the actual instruction (bpopcode) is fetched and returned from main memory without modifying the contents of the cache set. At the same time the state of the debug control indicator is changed to debug lock. In P1, the contents of the set for address swbpt are still in the cache. P2 has not yet fetched the swbpt address.

In (d), P0 is continuing to execute code other than the breakpoint instruction. P1 has fetched an instruction that has replaced the bpopcode instruction in its cache. P2 has made a fetch request to the swbpt address and brought the instruction at this address into its cache. P2 will not encounter a debug event since the bytes it fetched from main memory do not include a debug opcode.

The foregoing example is intended for purposes of illustration only, and should not be viewed as limiting the scope of the invention in any way.

Advantageously, the invention provides exclusive software breakpoint capability in a multiprocessor system with little or no impact on processor cycle time, minimal hardware cost, and without requiring program alteration. Importantly, the action of changing the debug control indicator state from don't use once to debug lock does not take place during the lookup process where the index is used to find a set and the tags are compared. Rather, the action of changing the debug control bit state takes place after the hit or miss determination is compete. In addition, there is no need for private local memory in each processor since the existing instruction cache memory is used. Furthermore, the executable code of a given user program can be used as is. There is no need to relocate it to private local memory so that the debug opcode can be managed. Furthermore, the invention allows exclusive software breakpoints to be used for code that is not cached, e.g., for code that has the noncacheable attribute.

It should also be noted that the invention makes the debugger more efficient when resuming from a breakpoint. With the invention, the debugger no longer has to perform the previously described two-step process of stepping the actual instruction and then replacing the debug opcode. This is a significant performance advantage for the debugger.

The techniques of the present invention can be utilized in conjunction with other software breakpoint techniques, including those described in the above-cited U.S. patent application Ser. No. 10/072,529.

Although illustrated using an actual instruction cache, the invention can be implemented at least in part utilizing dedicated hardware which provides the functionality described above but does not otherwise serve as an actual instruction cache in normal operation of a multiprocessor system. In other words, the dedicated hardware is configured substantially as an instruction cache but is used only in implementing exclusive breakpoints in accordance with the techniques of the invention. The term "instruction cache" as used herein is intended to include this type of dedicated hardware.

The present invention may be configured to meet the requirements of a variety of different processing applications and environments, using any desired types and arrangements of processor, instruction cache, bus and main memory elements. The above-described embodiments of the invention are therefore intended to be illustrative only, and numerous alternative embodiments may be used. For example, although the illustrative embodiment utilizes a particular debug control indicator format for breakpointed instructions stored in an instruction cache, other single-bit or multiple-bit indicators can also be used, as can other arrangements of different types of single-bit or multiple-bit indicators. In addition, the particular manner in which the a debug control indicator is updated may be altered. Furthermore, the breakpoint code, instruction, instruction address and cache set configurations may be varied as required to accommodate a given processing application or environment. Also, other cache architectures may be implemented with the debug control indicator feature of the present invention, including without limitation caches that implement multiple sets associated with each tag, that is, n-way set associative caches where n is 2, 4, etc. These and numerous other alternative embodiments within the scope of the following claims will be apparent to those skilled in the art.

What is claimed is:

1. A method of implementing a software breakpoint in a processor system having at least one processor coupled to a main memory, and an instruction cache associated with the processor, a breakpoint code being insertable at a particular location in the instruction cache, the method comprising the steps of:

setting a control indicator associated with the particular location to a first state which allows the breakpoint code to be returned to the processor from the instruction cache in response to a first fetch request directed to a corresponding address of the particular location;

subsequently setting the control indicator associated with the particular location to a second state which directs that a second fetch request to the corresponding address of the particular location be serviced from the main memory;

changing the control indicator state back to the first state after a determination has been made, from the control indicator having been set to the second state, that the second fetch request to the corresponding address of the particular location will be serviced from the main memory; and utilizing the breakpoint code to debug software instructions running on the processor system.

2. The method of claim 1 wherein the control indicator is set to the second state after a determination has been made, based on the control indicator having been set to the first state, that the breakpoint code will be returned to the processor from the instruction cache in response to the first fetch request.

3. The method of claim 1 wherein the processor system comprises a multiprocessor system having a plurality of processors each coupled to the main memory, each of the processors having an instruction cache associated therewith.

4. The method of claim 3 wherein the software breakpoint comprises an exclusive software breakpoint to be taken by each of a subset of the plurality of processors.

5. The method of claim 3 wherein the software breakpoint comprises an exclusive software breakpoint to be taken only by a single one of the plurality of processors.

6. The method of claim 1 wherein the control indicator comprises one or more debug control bits associated with a given set of the instruction cache.

7. The method of claim 1 wherein the first state comprises a debug lock state and the second state comprises a don't use once state.

8. The method of claim 1 wherein the control indicator specifies at least one additional state, comprising a normal mode of operation state specifying operation without utilization of the software breakpoint.

9. The method of claim 1 wherein the processor upon execution of the breakpoint code enters a debug mode of operation.

10. The method of claim 1 wherein while the control indicator is in the first state, a miss event in the instruction cache does not lead to replacement of the breakpoint code in the particular location in the instruction cache.

11. The method of claim 1 wherein the breakpoint code inserted at the particular location in the instruction cache is inserted for an instruction address having a noncacheable attribute associated therewith.

12. The method of claim 1 wherein the breakpoint code is inserted at the particular location in the instruction cache under the control of a debugger which interfaces with the processor system.

13. The method of claim 1 wherein the breakpoint code inserted at the particular location in the instruction cache comprises a debug opcode.

14. The method of claim 1 wherein at least a subset of the setting and changing steps are implemented at least in part in cache control logic associated with the instruction cache.

15. A processor system comprising:

a main memory;

at least one processor coupled to the main memory; and an instruction cache associated with the processor;

wherein a breakpoint code is insertable at a particular location in the instruction cache;

wherein a control indicator associated with the particular location is settable to a first state which allows the breakpoint code to be returned to the processor from the instruction cache in response to a fetch request directed to a corresponding address of the particular location, and to a second state which directs that a subsequent fetch request to the corresponding address of the particular location be serviced from the main memory;

wherein the control indicator state is changed back to the first state after a determination has been made, from the control indicator having been set to the second state, that the second fetch request to the corresponding address of the particular location will be serviced from the main memory; and wherein the breakpoint code maybe utilized to debug software instructions running on the processor system.

16. An article of manufacture comprising a processor-readable storage medium for storing one or more software programs for implementing a software breakpoint in a processor system having at least one processor coupled to a main memory, and an instruction cache associated with the processor, a breakpoint code being insertable at a particular location in the instruction cache, wherein the one or more software programs when executed implement the steps of:

setting a control indicator associated with the particular location to a first state which allows the breakpoint code to be returned to the processor from the instruction cache in response to a first fetch request directed to a corresponding address of the particular location;

subsequently setting the control indicator associated with the particular location to a second state which directs that a second fetch request to the corresponding address of the particular location be serviced from the main memory;

changing the control indicator state back to the first state after a determination has been made, from the control indicator having been set to the second state, that the second fetch request to the corresponding address of the particular location will be serviced from the main memory; and allowing the breakpoint code to be utilized to debug software instructions running on the processor system.

* * * * *

UNITED STATES PATENT AND TRADEMARK OFFICE
CERTIFICATE OF CORRECTION

| | | |
|---|---|---|
| PATENT NO. | : 7,296,259 B2 | Page 1 of 1 |
| APPLICATION NO. | : 10/241400 | |
| DATED | : November 13, 2007 | |
| INVENTOR(S) | : M.R. Betker et al. | |

It is certified that error appears in the above-identified patent and that said Letters Patent is hereby corrected as shown below:

Column 8, line 64, replace "Pi" with --P$i$--

Column 9, lines 1 through 7, replace "Pi" with --P$i$--

In the claims:

Claim 15, column 12, line 27, delete "maybe" and insert --may be--

Signed and Sealed this

Sixth Day of May, 2008

JON W. DUDAS
*Director of the United States Patent and Trademark Office*